Patented Oct. 4, 1927.

1,643,988

UNITED STATES PATENT OFFICE.

GEORGE B. LUCKETT AND JOHN A. JOHNSON, OF CRAWFORDSVILLE, INDIANA.

REFRACTORY MATERIAL SUITABLE FOR COVERINGS AND THE PROCESS OF FORMING SAME.

No Drawing.     Application filed July 14, 1924. Serial No. 726,031.

This invention relates to a refractory material secured from a waste product.

The chief object of the invention is to produce a refractory and bonding material which can be utilized in various ways such as for example: a covering or coating, paint like in character, a binder such as a mortar or an article such as a brick or block.

The chief feature of the invention consists in the recovery from the waste discharged from acetylene plants of a bonding material that is adapted to prolong the life of all surfaces which are subjected to intense heat, such as boiler settings, baffle walls, fire box linings, etc. for use particularly with clay and silica brick.

The invention consists in the product and the process of obtaining the same.

The discharge from acetylene plants consists of a creamy liquid that usually is discharged onto a dump and thereafter dries in commercial plants.

The present invention utilizes this waste liquor discharge, or the dried material on the dump suitably processed into a liquor form, so as to produce a material that has a consistency of thick cream. This material is passed thru suitable screens which eliminates all of the larger particles and all of the objectionable débris as well. While at this consistency common salt is added and it has been determined that one ounce to each gallon of the liquid is a satisfactory proportion. The waste liquor consists essentially of calcium hydroxide, the acetylene gas reaction being as follows:

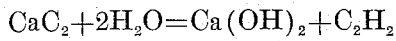
$$CaC_2 + 2H_2O = Ca(OH)_2 + C_2H_2$$

When these two ingredients, that is the adulterated calcium hydrate plus calcium chloride, are thoroughly mixed the resultant liquid may be applied to any surface in the form of a paint. For fire wall and similar purposes the material is applied in successive coats, each coat being permitted to dry before heat is applied. The addition of the salt accelerates the hardening or setting up of the calcium hydroxide and also acts partially as a flux for securing a fire resistant bond between the calcium hydroxide material and the wall or surface supporting the same. Likewise, the salt materially assists in the glazing vitrifaction process. As a result thereof the surface, such as brick or the like, is glazed and bonded into a substantially solid vitrified sheet which is produced by reason of the bonding and fusing of the surface of the component parts of the structure together to form practically a solid mass.

The resultant surface does not sluff off, loosen or deteriorate upon the brick or blocks and, therefore, prevents loosening and deteriorating of the mortar used in setting up the brick of the wall and, therefore, prevents the disintegration of the wall or structure.

The invention claimed is:

1. A refractory coating material comprising acetylene plant waste (essentially calcium hydroxide) and sodium chloride in the approximate proportions of one ounce of chloride to one gallon of waste of a thick cream consistency.

2. A highly refractory coating for fire brick and the like, consisting of acetylene plant waste, chiefly calcium hydroxide, and having a relatively high melting point, and a relatively small amount of fluxing material for lowering the melting point of the waste to that to which the fire brick are normally subjected, whereby said waste will fuse and vitrify on the brick if of clay or silicate for coating the same and prolonging the life thereof.

In witness whereof, we have hereunto affixed our signatures.

GEORGE B. LUCKETT.
JOHN A JOHNSON.